United States Patent [19]

Zeman

[11] 4,196,884
[45] Apr. 8, 1980

[54] APPARATUS FOR MAKING WEEDLESS ELASTOMERIC FISHING LURE

[76] Inventor: Jack R. Zeman, P.O. Box 10167, Ft. Lauderdale, Fla. 33305

[21] Appl. No.: 921,756

[22] Filed: Jul. 3, 1978

Related U.S. Application Data

[62] Division of Ser. No. 796,435, May 12, 1977, abandoned.

[51] Int. Cl.$^2$ .................. A01K 85/00; B22C 9/24
[52] U.S. Cl. ................... 249/55; 43/42.06; 43/42.1; 43/42.39; 249/142; 264/318; 425/577
[58] Field of Search .................. 249/55, 63, 142; 425/116, 117, 127, 577

[56] References Cited

U.S. PATENT DOCUMENTS

| | | | |
|---|---|---|---|
| 1,604,274 | 10/1926 | Gammeter | 249/63 |
| 3,025,628 | 3/1962 | Murawski | 43/42.1 |
| 3,849,053 | 11/1974 | Bruce et al. | 249/63 |
| 3,968,951 | 7/1976 | Zeman | 249/55 |
| 4,126,291 | 11/1978 | Gilbert et al. | 249/63 |

FOREIGN PATENT DOCUMENTS 2248788 5/1975 France .................. 43/42.06

Primary Examiner—Paul Lieberman
Assistant Examiner—Arthur H. Koeckert
Attorney, Agent, or Firm—Oltman and Flynn

[57] ABSTRACT

The present fishing lure has a molded elastomeric body with a deep, narrow, longitudinal recess in which the curved hook end of a fishhook is concealed. The present apparatus for making this lure includes an insert for forming this recess which is separate from the molding dies and is removable from the elastomeric body after the latter has been molded. The fishhook may be part of this insert, so as to be molded in place in the lure body, or it may be inserted into the lure body after the latter has been molded. In one embodiment the removable insert forms an inclined passageway for passing water up from the bottom of the lure body into its aforementioned recess to impart a wiggling motion to the lure as it moves through the water.

8 Claims, 14 Drawing Figures

U.S. Patent  Apr. 8, 1980  Sheet 1 of 3  4,196,884
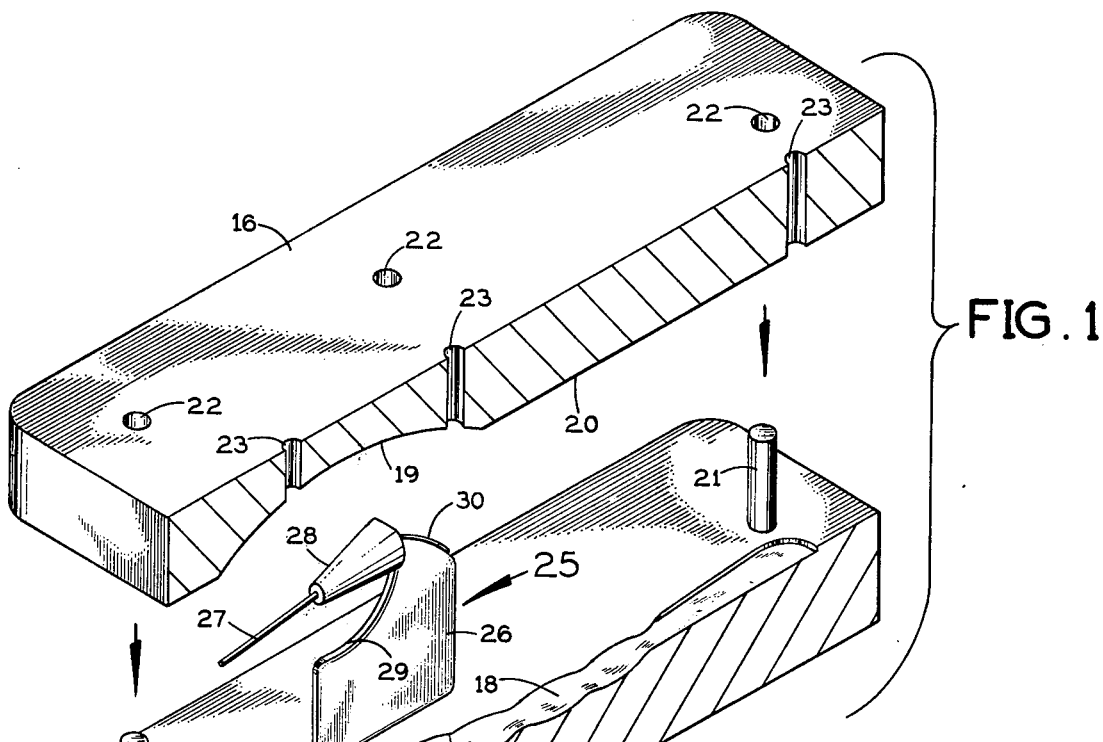
FIG. 1
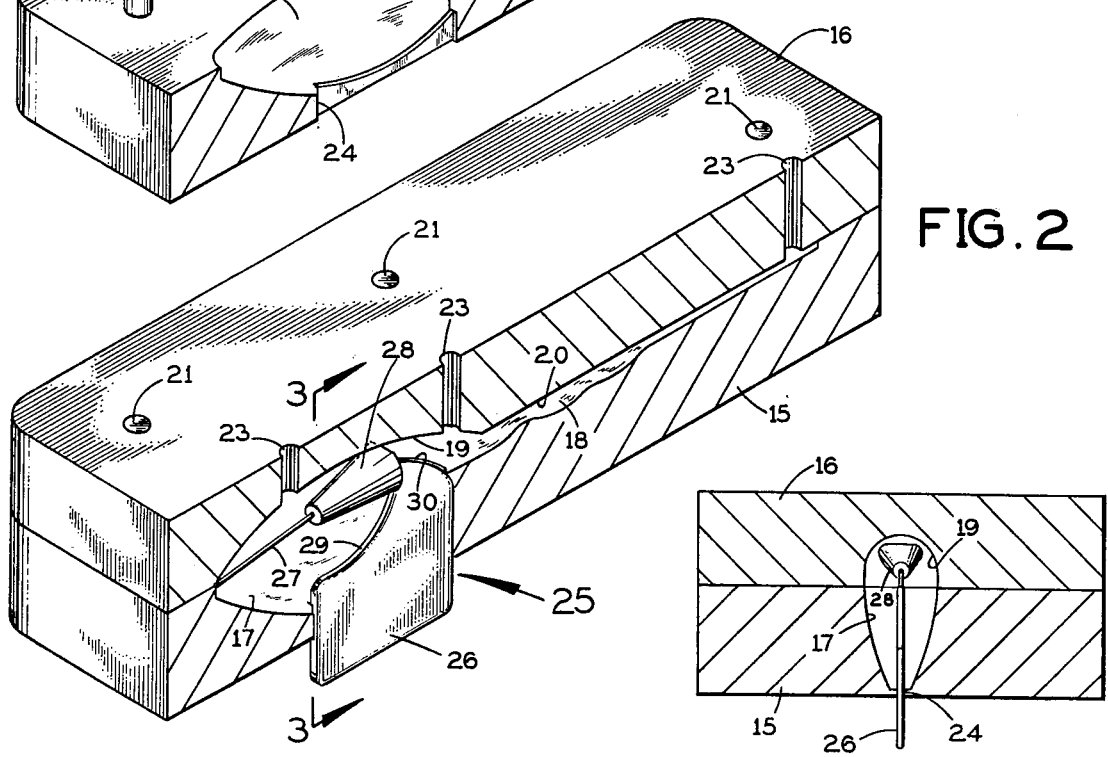
FIG. 2
FIG. 3

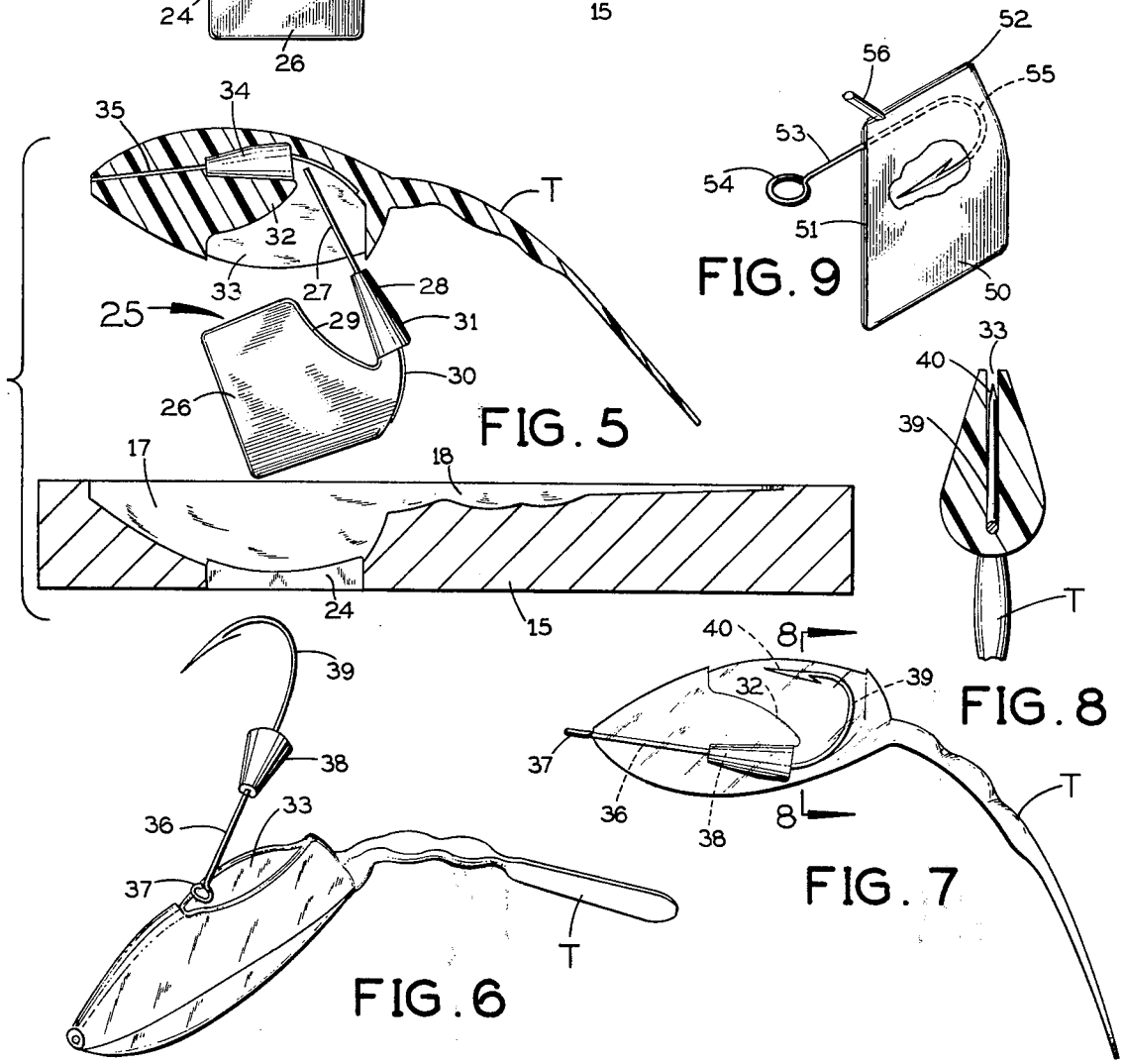

APPARATUS FOR MAKING WEEDLESS ELASTOMERIC FISHING LURE

CROSS REFERENCE TO RELATED APPLICATION

This application is a division of my copending application, Ser. No. 796,435, filed May 12, 1977 now abandoned.

BACKGROUND AND SUMMARY OF THE INVENTION

Various artificial fishing lures which incorporate a fishhook have been proposed heretofore. For example, my U.S. Pat. No. 3,646,699 discloses an artificial fishing lure carrying a partly concealed fishhook that is pivotally mounted for movement between a retracted position and an extended, fish-impaling position when a fish strikes. As another example, my U.S. Pat. No. 3,968,951 discloses an artificial fishing lure having a fully concealed fishhook which becomes exposed for impaling a fish when the fish strikes the lure and in so doing deforms the elastomeric sides of the lure body on either side of the hook.

One aspect of the present invention is directed to a novel and improved apparatus for forming a fishing lure with a deep, narrow, longitudinal recess in which the curved hook end of a fishhook is fully concealed normally. This apparatus has an insert for forming this recess during the molding operation which is removable later on. In one embodiment of the apparatus the fishhook is inserted into the elastomeric body of the lure after the insert has been removed. In other embodiments of this apparatus the fishhook is included in the insert so as to be molded into the elastomeric lure body and to remain in it after the remainder of the insert is removed. Also by virtue of the pocket formed within the said lure body it enables one to insert natural bait particles and/or spraying chemically compounded odors for enticing or attracting fish.

Another aspect of this invention is directed to the novel features of the fishing lure itself for enhancing its allure in the water to unwary fish.

Further objects and advantages of this invention will be apparent from the following detailed description of three presently-preferred embodiments thereof, which are shown in the accompanying drawings in which:

FIG. 1 is an exploded perspective view, with parts broken away for clarity, showing upper and lower dies in the present molding apparatus separated and showing a removable insert between them in accordance with a first embodiment of this invention;

FIG. 2 is a similar view showing the dies brought together for molding an elastomeric fishing lure around the insert in the mold cavity between the dies;

FIG. 3 is a vertical cross-section taken along the line 3—3 in FIG. 2;

FIG. 4 is a vertical longitudinal section taken along the longitudinal centerline of the FIG. 2 apparatus;

FIG. 5 is an exploded view showing the lure and the lower die in longitudinal section and the insert in elevation;

FIG. 6 is an exploded perspective view showing the molded elastomeric lure produced by the apparatus of FIGS. 1-4 and the fishhook for inserting therein;

FIG. 7 is a longitudinal elevation of the finished lure (with the fishhook therein) in accordance with this first embodiment of the present invention;

FIG. 8 is a vertical cross-section taken along the line 8—8 in FIG. 7;

FIG. 9 is a perspective view, with parts broken away for clarity, of a removable insert for the molding apparatus which includes the fishhook in accordance with a second embodiment of this invention;

FIG. 10 is a longitudinal section through the molding apparatus with the insert of FIG. 9 therein and with the dies brought together to mold an elastomeric lure around the insert;

Figure 11:
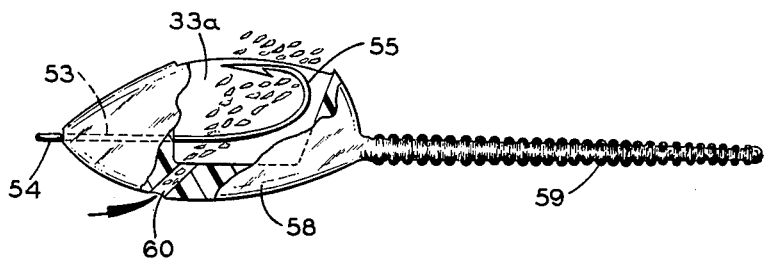
FIG. 11 is a longitudinal elevation, with parts broken away for clarity, showing the lure produced by the apparatus of FIG. 10 after the removable portion of the insert has been removed, leaving the fishhook embedded in the lure body.
Figure 12:
FIG. 12 is a top plan view on a larger scale showing the body and part of the tail of the lure shown in FIG. 11.

Before explaining the disclosed embodiments of the present invention in detail, it is to be understood that the invention is not limited in its application to the details of the particular arrangements shown, since the invention is capable of other embodiments. Also, the terminology used herein is for the purpose of description and not of limitation.

Referring first to FIG. 1-8, the present molding apparatus has a fixed lower die 15 and an upper die 16 that is reciprocable vertically toward and away from the lower die. Any suitable arrangement (not shown) may be provided for holding the lower die and reciprocating the upper die.

The lower die 15 presents an upwardly-facing concave recess including a body section 17 that is generally the shape of half an egg and an elongated tail section 18 extending longitudinally away from one end of the body section 17. The upper die 16 presents a downwardly-facing concave recess 19 that registers with the body section 17 of the recess in the lower die so as to form therewith a generally egg-shaped body section of the mold cavity when the dies are brought together, as shown in FIG. 2. The upper die presents a flat bottom face 20 overlying the elongated tail section 18 of the recess in the lower die. The lower die has upwardly projecting guide pins 21 which are slidably received in corresponding vertical openings 22 in the upper die.

The upper die has vertical injection passages 23 which extend from its top face down into the mold cavity, as best seen in FIG. 2.

The lower die has a narrow longitudinal opening or slot 24 at the bottom (FIG. 1) which leads into the body section 17 of its mold cavity recess.

In accordance with the present invention, an insert 25 (FIG. 1) which is separate from both dies 15 and 16 extends into the generally egg-shaped body section of the mold cavity to form the internal structure of the body of the fish lure. This insert is readily removable from the lure body after the molding operation has taken place, as explained hereinafter.

In the embodiment of FIGS. 1-5, this insert has a vertically disposed, platelike, thin segment 26, an elongated narrow stem 27 projecting approximately horizontally away from the inner end of segment 26, and a tapered anchoring member 28 between the thin segment 26 and the stem 27.

The thin segment 26 of the insert has closely spaced, opposite major faces which extend parallel to each other and are elongated lengthwise of the mold cavity, with a snug, sliding fit in the bottom opening 24 in the lower die 15, as best seen in FIG. 2. Inside the mold cavity the thin segment 26 of the insert is progressively reduced in length, presenting an inwardly extending concave edge 29 which tapers longitudinally of the mold cavity toward the latter's tail section 18. The inner end of the thin segment 26 is less than half the length of its outer end. This thin segment 26 of insert 25 extends into the body section of the mold cavity for substantially more than half the latter's depth.

The stem 27 extends axially through the anchoring member 28 of the insert and has a curved inner end 30 which overlies and is rigidly fastened to the inner edge of the thin segment 26 of the insert.

The anchoring member 28 is approximately frusto-conical in shape, tapering inwardly along its length away from the tail section 18 of the mold cavity. At its top edge in FIG. 4, the anchoring member has a flattened surface 31 which is spaced from the adjacent wall of the mold recess 19 in the upper die so that the anchoring member will be completely embedded in the elastomeric lure body.

In FIG. 4 the tapered anchoring member 28 extends in spaced overlying relationship to the concave edge 29 of the thin segment 26 of the insert, so that between them they define a recess for molding an internal cantilevered shelf 32 in the lure body. This recess between the anchoring member 28 and edge 29 is open at the end of the mold cavity away from its tail section. Because of the curvature and inclination of the edge 29, the internal shelf 32 in the lure body is of progressively smaller size toward its free end (i.e., toward the tail section of the mold cavity.)

After the elastomeric lure body with the attached tail has been molded between the dies and the dies have been separated, the insert 25 may be manually slipped out of the lure body as illustrated in FIG. 5, with the thin segment 26 of the insert coming out first and the stem 27 coming out last.

The molded lure body has a narrow, deep, longitudinal recess 33 (shaped complementary to the thin segment 26 of the insert), the aforementioned internal shelf 32 at the inner end of recess 33 for about half its length, an approximately frusto-conical anchoring recess 34 located at the inner side of shelf 32 and communicating at its wider end with the longitudinally reduced inner end of the narrow, deep, longitudinal recess 33, and an elongated narrow passageway 35 extending longitudinally from the narrower end of the anchoring recess 34 to the opposite end of the lure body from its tail.

The tail T attached to the lure body is relatively thin and is easily flexible.

As shown in FIGS. 6-8, the complete lure includes a fishhook having a straight shank 36 with an eye 37 on the end for attaching a fishing line, a generally frusto-conical anchoring member 38 at the opposite end of the straight shank 36, and a curved hook end 39 at the opposite end of the anchoring member 38 from the straight shank 36. As indicated in FIG. 6, the fishhook may be assembled to the lure by first inserting the eye 37 down into the narrow longitudinal recess 33 in the lure body and then through the anchoring recess 34 and the narrow passageway 35 in the lure body until the eye 37 is located next to the opposite end of the lure body from the tail T. As shown in FIG. 7, this leaves the straight shank 36 of the fishhook extending snugly along the passageway 35 in the lure body, and the anchoring member 38 on the fishhook snugly received in the complementary recess 34 in the lure body. The curved hook end 39 extends into the inner end of the narrow longitudinal recess 33 in the lure body and curves back around the internal shelf 32, terminating in a sharp-pointed barb 40 which faces away from the tail. The curved hook end 39 of the fishhook normally is completely disposed within the deep, narrow, longitudinal recess 33 in the lure body so as not to get caught on weeds as the lure travels through the water.

As shown in FIG. 8, the walls of the lure body on opposite sides of its deep, narrow, longitudinal recess 33 become progressively thinner away from the bottom of the recess. Consequently, these side walls are easily flexible in the vicinity of the barbed end 40 of the fishhook when a fish strikes the lure.

FIG. 9 shows a different insert for use with upper and lower dies 15a and 16a which are similar, but not identical, to the dies 15 and 16 in FIGS. 1-5. The upper die 15a (FIG. 10) has an elongated downwardly-facing recess 20a on the bottom with closely spaced, transverse corrugations for forming complementary corrugations in the tail of the lure. The lower die 16a has a matching upwardly-facing recess 18a at the top for forming similar corrugations in the bottom of the tail of the lure. The body section recesses 17a and 19a in the lower and upper dies, respectively, and the elongated narrow opening 24a in the bottom of the lower die are essentially similar to the recesses 17 and 19 and the opening 24 in the dies of FIGS. 1-5.

The insert shown in FIG. 9 has a thin segment which consists of two flat, confronting metal leaves 50 and 51 which are connected by an integral bridging or bight segment 52 at the top in FIG. 9. The insert also includes a fishhook having a straight shank 53, part of which is snugly engaged between the folded-over metal leaves 50, 51 and part of which projects beyond these leaves and carries an eye 54 on its outer end. The fishhook has a curbed hook end 55 at the opposite end of its straight shank 53 which is snugly received between the leaves 50, 51 of the insert so as to be confined between them while the lure body is being molded.

Attached to one of the leaves of the insert at its upper end in FIG. 9 is a short narrow stem 56, which is inclined upward at about 45 degrees to the straight shank 53 of the fishhook.

As shown in FIG. 10, this insert is inserted into the body section of the mold cavity formed between the upper and lower dies 15a and 16a. The folded-over flat leaves 50, 51 of the insert extend snugly but slidably up through the opening 24a in the bottom of the lower die 16a. The curved hook end 55 and part of the straight shank 53 of the fishhook are confined between these leaves inside the mold cavity, and the remainder of the straight shank 53 of the fishhook projects beyond these leaves longitudinally away from the tail section of the mold cavity. The inclined stem 56 projects up into engagement with the top of the mold recess 19a in the upper die 15a at an inclination of about 135 degrees away from the tail section of the mold cavity. The eye 54 of the fishhook is received in an upwardly-facing, shallow groove 57 (FIG. 10) in the top of the lower die 16a at the opposite end of the body recess 17a from the tail recess 18a therein.

The finished lure is shown in detail in FIG. 11. The eye 54 of the fishhook abuts against the generally egg-shaped elastomeric body 58 of the lure at the opposite end from the tail 59. The straight shank 53 of the fishhook is embedded in the lure body 58, and the curved hook end 55 of the fishhook is completely disposed inside the narrow, deep, longitudinal recess 33a formed in the lure body 58. At the bottom of the lure in FIG. 11, an upwardly inclined passageway 60 (formed by the stem 56 on the insert) extends up from the bottom face of the lure into the bottom of the recess 33a at an angle of about 45 degrees toward the tail. As shown in this Figure, as the lure is pulled through the water, water flows up through this inclined passageway 60 into the recess 33a, imparting a wiggling action to the flexible, relatively thin side walls of the lure body on opposite side of this recess and to the tail 59, as well.

Figure 13:
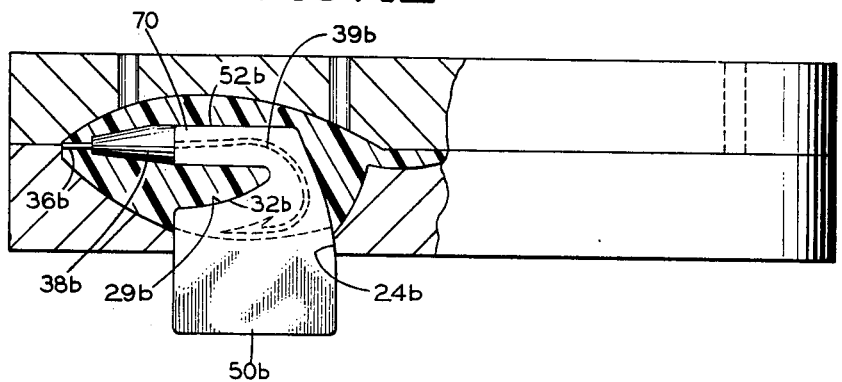
FIG. 13 is a view partly in longitudinal section and partly in longitudinal elevation, showing the apparatus for molding a fishing lure in accordance with a third embodiment of this invention.
Figure 14:
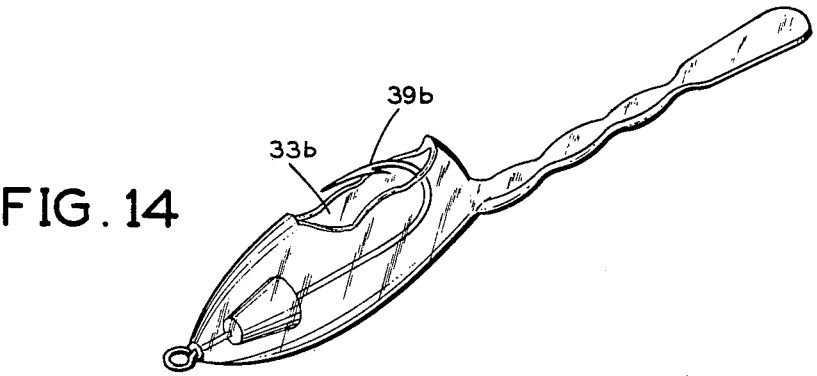
FIG. 14 is a perspective view of the finished lure according to this third embodiment of the invention.

In the third embodiment of the invention, shown in FIGS. 13 and 14, elements corresponding to those in FIGS. 9–12 and in FIGS. 1–8 are given the same reference numerals, but with a "b" suffix added.

The insert is generally similar to the one shown in FIG. 9, having opposed, confronting, thin, flat leaves which snugly hold between them the curved hook and 39b of a fishhook. Only one of these leaves, 50b, appears in FIG. 13; the other flat leaf is directly behind it. These flat leaves are interconnected at the top in FIG. 13 by an integral bight segment 52b. For most of their extent each of the flat leaves of the insert has the same configuration as the thin segment 26 of the insert 25 in FIG. 1, and each presents a curved tapered edge 29b like the curved edge 29 in FIG. 1. At the inner end of this curved edge 29b, each leaf of the FIG. 13 insert has an extension 70 which projects longitudinally away from the tail section of the mold cavity. This longitudinal extension 70 is in spaced, confronting relationship to the corresponding curved edge 29b so as to form a groove between them for forming a cantilevered internal shelf 32b in the elastomeric body of the lure.

This insert also includes a fishhook which is basically similar to the fishhook in FIGS. 6 and 7. Referring to FIG. 13, the fishhook in the insert has a short, straight shank 36b, a generally frusto-conical anchoring member 38b, and a curved hook end 39b. The anchoring member 38b has its larger end abutting against the longitudinal extensions 70 on the flat, confronting leaves of the insert. The curved hook end 39b of the fishhook is snugly engaged between the flat leaves of the insert at the latter's longitudinal extensions 70 and around the shelf-forming groove between these extensions and the curved edges 29b.

After the elastomeric body and tail of the lure have been molded, the flat-leaved part of the insert (including the integral extensions 70) may be pulled out of the opening 24b in the bottom of the lure body in FIG. 13, leaving the hook embedded in the lure, with its anchoring member 38b held in a complementary recess in the lure body and with its curved hook end 39b extending around the internal shelf 32b on the lure body and completely disposed within the deep, narrow, longitudinal groove 33b in the lure body.

I claim:

1. In an apparatus for molding an elastomeric, weedless fishing lure having a generally egg-shaped body and an elongated tail extending from one end of the body, said apparatus having first and second dies which, when brought together, define between them a mold cavity having a generally egg-shaped body section and an elongated tail section extending longitudinally from one end of said body section, the improvement which comprises:

an insert separate from both dies having a flat, thin segment extending more than half way into said body section of the mold cavity, said thin segment of the insert having closely spaced opposite major faces which extend longitudinally of said body section of the mold cavity for more than half the body section's depth between said dies, the thickness of said thin segment between said major faces being substantially less than the depth of the mold cavity between said dies, whereby to form a deep, narrow, elongated recess in the body of the lure for receiving the curved hook end of a fishhook, said insert being removable from said cavity after the lure has been molded therein;

an elongated narrow stem projecting away from the inner end of said thin segment longitudinally of the body section of the mold cavity directly away from the tail section of the mold cavity;

and an enlarged, tapered anchoring member connecting the inner end of said thin segment with the projecting stem, said anchoring member projecting transversely beyond said opposite major faces of said thin segment and tapering inwardly toward said projecting stem to form a tapered anchoring recess in the body of the lure between the inner end of said deep, narrow recess in the body of the lure and the narrow elongated opening formed by said stem in the body of the lure.

2. An apparatus according to claim 1 wherein said thin segment of the insert toward its inner end in the mold cavity is reduced in size longitudinally toward the tail section of the mold cavity so as to provide a longitudinal recess in the insert which is open at the edge of said thin segment away from the tail section of the mold cavity, whereby to form a cantilevered internal shelf in the body section of the lure which projects longitudinally toward the tail section of the lure.

3. An apparatus according to claim 2 wherein, at the inner end of said insert in the mold cavity, said anchoring member extends across said longitudinal recess in the insert away from the tail section of the mold cavity.

4. An apparatus according to claim 2 wherein, at the inner end of said insert in the mold cavity, said thin segment of the insert has an inner end extension which extends across said longitudinal recess therein away from the tail section of the mold cavity.

5. An apparatus according to claim 4 wherein said anchoring member is attached to said inner end extension on said thin segment of the insert and projects away from said tail section of the mold cavity substantially beyond said longitudinal recess in the insert.

6. In an apparatus for molding an elastomeric, weedless fishing lure having a generally egg-shaped body and an elongated tail extending from one end of the body, said apparatus having first and second dies which, when brought together, define between them a mold cavity having a generally egg-shaped body section and an elongated tail section extending longitudinally from one end of said body section, the improvement which comprises:

an insert separate from both dies having a flat, thin segment extending more than halfway into said body section of the mold cavity from one side of said cavity, said thin segment of the insert having closely spaced opposite major faces which extend longitudinally of said body section of the mold cavity for more than half the body section's depth between said dies, the thickness of said thin segment between said major faces being substantially less than the depth of the mold cavity between said dies, whereby to form a deep, narrow elongated recess in the body of the lure for receiving the curved hook end of a fishhook, said insert being removable from said cavity after the lure has been molded therein;

said thin segment of the insert comprising thin confronting leaves adapted to hold the curved end of the fishhook between them with the shank of the fishhook projecting longitudinally beyond said leaves away from the tail section of the mold cavity, said leaves being slidably removable from said deep narrow recess in the body of the lure to leave the shank of the fishhook embedded in the body of the lure.

7. An apparatus according to claim 6, wherein said insert has a projecting stem at the inner end of its thin segment which extends across the cavity from said one side at an acute angle away from the tail section of the mold cavity to form in the body of the lure an inclined water passageway leading into said deep narrow recess therein.

8. An apparatus according to claim 7, wherein said confronting leaves are joined to each other outwardly from the fishhook.

* * * * *